United States Patent
Lee et al.

(10) Patent No.: US 12,401,209 B2
(45) Date of Patent: Aug. 26, 2025

(54) DEVICE AND METHOD FOR BLOCKING CURRENT USING DISCONNECTOR

(71) Applicant: LG ENERGY SOLUTION, LTD., Seoul (KR)

(72) Inventors: Chang Bog Lee, Daejeon (KR); Jae Chan Lee, Daejeon (KR); Hyeon Jin Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 693 days.

(21) Appl. No.: 17/770,806

(22) PCT Filed: Nov. 30, 2020

(86) PCT No.: PCT/KR2020/017240
§ 371 (c)(1),
(2) Date: Apr. 21, 2022

(87) PCT Pub. No.: WO2021/112509
PCT Pub. Date: Jun. 10, 2021

(65) Prior Publication Data
US 2022/0376520 A1 Nov. 24, 2022

(30) Foreign Application Priority Data
Dec. 6, 2019 (KR) .................. 10-2019-0161949

(51) Int. Cl.
*H02J 7/00* (2006.01)
(52) U.S. Cl.
CPC .......... *H02J 7/0031* (2013.01); *H02J 7/0013* (2013.01); *H02J 7/00304* (2020.01); *H02J 7/00308* (2020.01); *H02J 7/00309* (2020.01)

(58) Field of Classification Search
USPC ........................................ 320/134
See application file for complete search history.

(56) References Cited

U.S. PATENT DOCUMENTS

2008/0106234 A1* 5/2008 Yun .................. H02J 7/00047
320/124
2011/0074384 A1 3/2011 Vano
(Continued)

FOREIGN PATENT DOCUMENTS

| CN | 106451610 A | 2/2017 |
| CN | 107210602 A | 9/2017 |

(Continued)

OTHER PUBLICATIONS

Extended European Search Report for European Patent Application No. 20895509.6 dated Sep. 15, 2022.
(Continued)

*Primary Examiner* — Samuel Berhanu
(74) *Attorney, Agent, or Firm* — Birch, Stewart, Kolasch & Birch, LLP

(57) ABSTRACT

An energy storage system (ESS) including a plurality of battery modules and a battery protection unit, the battery protection unit includes a microcontroller (MCU) for controlling charge and discharge of the ESS, a first main contactor and a second main contactor connecting or disconnecting between the plurality of battery modules and an output terminal of the ESS under control of the MCU, and a disconnector disposed between the first main contactor and the second main contactor and connecting or disconnecting the plurality of battery modules, the first main contactor, and the second main contactor, the first main contactor and the second main contactor are turned on or off, by the MCU, depending on whether a predetermined voltage is applied.

11 Claims, 2 Drawing Sheets

(56) References Cited

U.S. PATENT DOCUMENTS

| | | |
|---|---|---|
| 2013/0163134 A1 | 6/2013 | Ji |
| 2013/0313896 A1 | 11/2013 | Gless et al. |
| 2014/0370940 A1* | 12/2014 | Yoshida ............ H02J 7/0048 |
| | | 315/161 |
| 2015/0288212 A1* | 10/2015 | Kim .................. H02H 3/24 |
| | | 307/80 |
| 2016/0243954 A1 | 8/2016 | Moro et al. |
| 2017/0302091 A1 | 10/2017 | Schaedlich et al. |
| 2019/0123567 A1 | 4/2019 | Kaneko |
| 2020/0127483 A1 | 4/2020 | Kim et al. |

FOREIGN PATENT DOCUMENTS

| | | |
|---|---|---|
| CN | 110537288 A | 12/2019 |
| EP | 3 267 460 A1 | 1/2018 |
| EP | 3 429 048 A1 | 1/2019 |
| JP | 2011-72153 A | 4/2011 |
| JP | 2012-182911 A | 9/2012 |
| JP | 2015-95934 A | 5/2015 |
| JP | 2016-162713 A | 9/2016 |
| KR | 10-2013-0075640 A | 7/2013 |
| KR | 10-2013-0083177 A | 7/2013 |
| KR | 10-2013-0083528 A | 7/2013 |
| KR | 10-2015-0090371 A | 8/2015 |
| KR | 10-2015-0115560 A | 10/2015 |
| KR | 10-2017-0002298 A | 1/2017 |
| KR | 10-2019-0107403 A | 9/2019 |
| KR | 10-2019-0123586 A | 11/2019 |
| WO | WO 2018/056263 A1 | 3/2018 |

OTHER PUBLICATIONS

International Search Report (PCT/ISA/210) issued in PCT/KR2020/017240, dated Mar. 2, 2021.

\* cited by examiner

DEVICE AND METHOD FOR BLOCKING CURRENT USING DISCONNECTOR

TECHNICAL FIELD

The present invention relates to a device and method for cutting-off current using a disconnector in an ESS.

BACKGROUND ART

An Energy Storage System (ESS) is used to stably connect a power produced from renewable energy to a power system. Renewable energy is electric energy generated through solar or wind power generation, and has a disadvantage in that power production stability is poor. In order to solve these shortcomings, renewable energy is used in combination with the ESS. The ESS is a battery using Li-Ion Battery (LIB), and the like, and stores excess power and discharges it when power is insufficient to stabilize power supply and demand. In other words, the ESS improves power utilization efficiency by accumulating and storing renewable energy that is insignificantly gathered when power demand is low, and then using the stored power during peak times when the power demand is high.

Such an ESS requires a function of manually cutting off the current by the user for abnormal situations or inspection.

Conventionally, a circuit breaker was used for this function.

However, since the conventional circuit breaker further includes a function of blocking the current path in case of overcurrent in addition to the function of manually blocking the current by the user, there is a disadvantage of high price.

On the other hand, it is possible to manually cut off the current by using a disconnector instead of an expensive circuit breaker but the disconnector can be turned on or off only in the no-load state, so that there is a disadvantage that it cannot be turned on or off when the ESS is in use.

Accordingly, the present invention proposes a device and method for manually cutting off current even if it is not in a no-load state by using an inexpensive disconnector instead of such a conventional expensive circuit breaker.

(Patent Document 0001) Korean Laid-Open Patent Publication No. 10-2015-0090371

DISCLOSURE

Technical Problem

The present invention provides a device and method capable of manually blocking a current flowing through an ESS by using a disconnector even in a no-load state.

Technical Solution

According to an embodiment of the present invention, an energy storage system (ESS) includes a plurality of battery modules and a battery protection unit, wherein the battery protection unit includes: a microcontroller (MCU) configured to control charge and discharge of the ESS; a first main contactor and a second main contactor connecting or disconnecting between the plurality of battery modules and an output terminal of the ESS under control of the MCU; and a disconnector disposed between the first main contactor and the second main contactor and connecting or disconnecting the plurality of battery modules, the first main contactor, and the second main contactor.

The first main contactor and the second main contactor are turned on or off, by the MCU, depending on whether a predetermined voltage is applied.

The disconnector may include: a first current cut-off switch having a first end connected to a positive (+) end of the plurality of battery modules and a second end connected to a first main contactor to block a current path flowing through the first main contactor; and a second current cut-off switch having a first end connected to a negative (−) end of the plurality of battery modules and a second end connected to a second main contactor to block a current path flowing through the second main contactor.

The disconnector may include an auxiliary switch for controlling whether a predetermined voltage is applied to the first main contactor and the second main contactor.

When the auxiliary switch is turned off, the first main contactor and the second main contactor may be turned off by cutting off predetermined power supplied to the first main contactor and the first main contactor, wherein when the first main contactor and the second main contactor are turned off, the ESS may become a no-load state.

The first and second current cut-off switches may be turned off after the first and second main contactors are turned off.

The battery protection unit may further include: a first fuse having a first end connected to a positive (+) end of the plurality of battery modules and a second end connected to the first main contactor through the disconnector; and a second fuse having a first end connected to a negative (−) end of the plurality of battery modules and a second end connected to the second main contactor through the disconnector.

When at least one of overvoltage, overcurrent, and high temperature is detected, the MCU may turn off the first main contactor and the second main contactor.

The ESS may further include a pre-charge FET connected in parallel to the first main contactor to prevent inrush current.

A method for performing manual power disconnection in an energy storage system (ESS) including a disconnector according to an embodiment of the present invention includes: a main contactor off step of converting a rear end of the disconnector into a no-load state; and a current path blocking step of blocking an output current path of the ESS using the disconnector after performing the main contactor off step.

The main contactor off step may turn off the main contactor by cutting off the power supplied to the main contactor, thereby converting the rear end of the disconnector into a no-load state.

The disconnector includes a first current cut-off switch and a second current cut-off switch. The current path blocking step may turn off the first current cut-off switch and the second current cut-off switch of the disconnector to block the output current path of the ESS after the main contactor off step is performed.

Advantageous Effects

The present invention can manually cut off the current in the ESS without using an expensive circuit breaker.

In addition, the present invention is provided with a circuit for converting the ESS into a no-load state so that a low-cost passive current cut-off device can be applied by applying a disconnector in place of the conventional circuit breaker so that it is possible to provide a current cut-off device at low cost compared to the prior art.

MODE FOR INVENTION

Figure 1:
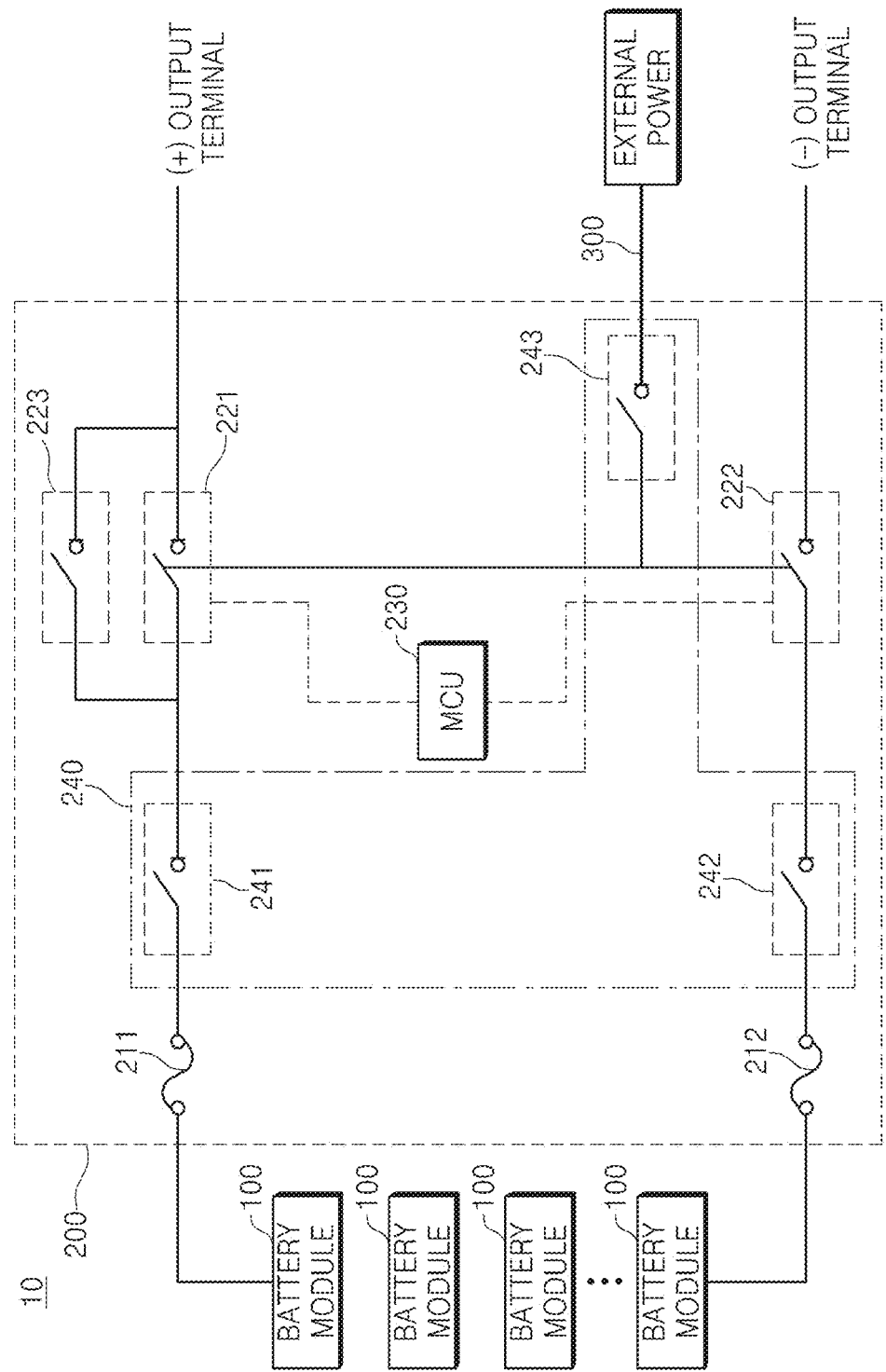
FIG. 1 is a diagram showing an ESS according to an embodiment of the present invention.

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

1. ESS According to Embodiment of Present Invention

In an ESS, by detecting overcurrent in addition to the function to manually cut off the current.

On the other hand, a disconnector is used as another element for manually blocking the current.

However, disconnectors have the advantage of being cheap, but the disconnector's current cut-off switch can be turned on or off only when the disconnector is in a no-load state, so that in general, there was a limit to apply and use in an ESS connected to a load.

Accordingly, in the present invention, even if the disconnector is not in a no-load state, a device for manually blocking current using a disconnector has been developed.

That is, in the present invention, as configuring an auxiliary switch in a circuit to which a disconnector is connected, when manual current interruption is required, by controlling the auxiliary switch, the disconnector is switched to a no-load state to manually cut off the current.

FIG. 1 is a diagram showing an ESS according to an embodiment of the present invention.

Hereinafter, an ESS according to an embodiment of the present invention will be described with reference to FIG. 1.

An ESS 10 according to the embodiment of the present invention may be configured to include a battery protection unit 200.

1) Battery Protection Unit 200 of Present Invention

The battery protection unit 200 includes an MCU 230 that controls the charging and discharging of the ESS 10, a first main contactor 221 and a second main contactor 222 connecting or blocking the plurality of battery modules 100 and the output terminals of the ESS under the control of the MCU 230, and a disconnector 240 that are provided between the first main contactor 221 and the second main contactor 222, and connect or block the plurality of battery modules 10 and the first main contactor 221 and the second main contactor 222.

1-1) MCU 230

When the ESS 10 needs to be charged or discharged, the MCU 230 according to an embodiment of the present invention charges or discharges the ESS by turning on the first main contactor 221 and the second main contactor 222, and while the ESS 10 is charging or discharging, when at least one of overvoltage, overcurrent, and high temperature is detected, the MCU 230 may block charging or discharging of the ESS 10 by turning off the first main contactor 221 and the second main contactor 222.

1-2) First Main Contactor 221 and Second Main Contactor 222

The first main contactor 221 and the second main contactor 222 may connect or short-circuit a plurality of battery modules and an output terminal of the ESS under the control of the above-described MCU 230.

For example, the first main contactor 221 is configured to connect between the (+) output terminal of the plurality of battery modules and the (+) output terminal of the ESS, and the second main contactor 222 is configured to connect between the (−) output terminal of the plurality of battery modules and the (−) output terminal of the ESS.

Meanwhile, the first main contactor 221 and the second main contactor 222 may be configured as relays that are turned on or off when a predetermined power is applied.

During normal operation, the first main contactor 221 and the second main contactor 222 are controlled by the MCU 230 to connect or block the ESS charging or discharging path.

In the present invention, in addition to this, depending on whether external power connected through the auxiliary switch 243 of the disconnector 240 to be described later is applied, it has an additional function of turning on or off the first main contactor 221 and the second main contactor 222, so that the disconnector switches the ESS to a no-load state when the current is cut off 1-3) Disconnector 240

The disconnector 240 is provided between the plurality of battery modules 100 and the first main contactor 221 and between the plurality of battery modules and the second main contactor 222 to cut off the output from the battery module.

Such a disconnector 240 includes a first current cut-off switch 241 for blocking the connection between the battery module and the first main contactor 221, a second current cut-off switch 242 for blocking the connection between the battery module and the second main contactor 222, and an auxiliary switch 243 for turning off the first main contactor 221 and the second main contactor 222 to allow the rear end of the disconnector 240 to be in a no-load state.

1-3-1) First Current Cut-Off Switch 241 and Second Current Cut-Off Switch 242

Specifically, the first current cut-off switch 241 is connected between the (+) terminal of the plurality of battery modules 100 and the first main contactor 221, thereby blocking the current path flowing through the first main contactor 221.

The second current cut-off switch 242 is connected between the (−) terminal of the plurality of battery modules 100 and the second main contactor 222, thereby blocking the current path flowing through the second main contactor 222.

The output current of the disconnector ESS is cut off through such cut-off control of the first and second switches.

Meanwhile, the first current cut-off switch 241 and the second current cut-off switch 242 may be configured as elements that are turned on or off only when the disconnector 240 is in a no-load state.

In the present invention, in order to turn on or off the first current cut-off switch 241 and the second current cut-off switch 242, the first main contactor 221 and the second main contactor 222 are turned off to switch the disconnector to the no-load state.

1-3-2) Auxiliary Switch 243

In order to convert the disconnector 240 into a no-load state, the first main contactor 221 and the second main contactor 222 are turned off by using the auxiliary switch 243.

Specifically, the auxiliary switch 243 may be configured to include a rotating handle. As the handle rotates, the auxiliary switch may be turned on or off.

For example, if the ESS 10 is in a normal state, the auxiliary switch 243 is operated in an on state and supplies a predetermined voltage to the first main contactor 221 and the second main contactor 222, and the first main contactor 221 and the second main contactor 222 are turned on, so that a first current path in which the first fuse 211→first current cut-off switch 241→first main contactor 221 are connected, is formed and a second current path in which the second fuse 212→second current cut-off switch 242→second main contactor 222 are connected, is formed.

On the other hand, when an abnormal operation of the ESS occurs or an inspection of the ESS is required, the auxiliary switch 243 provided in the disconnector 240 is manually switched to the off state to switch the disconnector to the no-load state.

Specifically, when the auxiliary switch 243 is manually turned off, power supplied to the first main contactor 221 and the second main contactor 222 through the power line 300 is cut off, so that the first main contactor 221 and the second main contactor 222 are turned off to convert the disconnector 240 into a no-load state.

In this way, as the first main contactor 221 and the second main contactor 222 are turned off, when the disconnector is in a no-load state, the first current cut-off switch 241 and the second current cut-off switch 242 are controlled to be turned off.

Accordingly, when an abnormal operation of the ESS occurs or an inspection of the ESS is required, the disconnector 240 may be used to block the front ends of the first main contactor 221 and the second main contactor 222.

In other words, through the above-described configurations, a function of manually blocking a current path by a conventional circuit breaker may be implemented.

1-4) First Fuse 211 and Second Fuse 212

On the other hand, the protection circuit unit of the present invention includes a first fuse in which one end is connected to the (+) end of the plurality of battery modules, and the other end is connected to the first main contactor through the disconnector and a second fuse in which one end is connected to the (−) end of the plurality of battery modules, and the other end is connected to the second main connector through the disconnector.

The first fuse 211 and the second fuse 212 may implement a function of blocking overcurrent when an overcurrent flows in a conventional circuit breaker.

1-5) Pre-Charge FET 223

Meanwhile, the ESS 10 according to an embodiment of the present invention further includes a pre-charge FET 223 connected in parallel with the first main contactor 221 to prevent inrush current.

2. Method of Manually Blocking Current in ESS According to Embodiment of Present Invention.

A method of manually blocking current in an ESS according to an embodiment of the present invention relates to a method of manually blocking current in the ESS using a disconnector without using a circuit breaker.

More specifically, by changing the structure so that the disconnector can be turned on/off even when it is not in a no-load state, instead of an expensive circuit breaker, the present invention relates to a method of manually cutting off current in an ESS.

Figure 2:
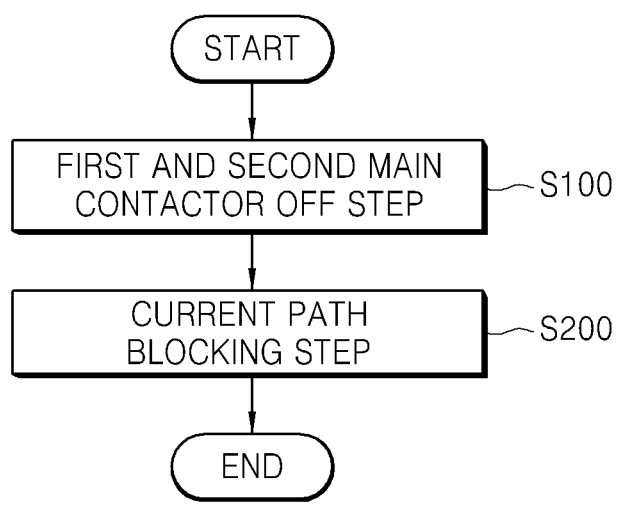
FIG. 2 is a flowchart illustrating a method of manually blocking current in an ESS according to an embodiment of the present invention.

FIG. 2 is a flowchart illustrating a method of manually blocking current in an ESS including a disconnector according to an embodiment of the present invention.

Hereinafter, a method of manually blocking current in an ESS including a disconnector according to an embodiment of the present invention will be described with reference to FIG. 2.

A method of manually blocking current in an ESS including a disconnector according to an embodiment of the present invention includes a main contactor off step S100 of allowing the rear end of the disconnector to be in a no-load state, and a current path blocking step S200 of blocking the output current path of the ESS using the disconnector after performing the main contactor off step.

Since the disconnector can control the switch only in the no-load state, in order to manually cut off current using a disconnector, the disconnector should be made in a no-load state.

The main contactor off step S100 is a step of allowing the disconnector to be in a no-load state.

Specifically, the main contactor off step S100 is a step of switching the rear end of the disconnector into a no-load state by cutting off power supplied to the main contactor and turning off the main contactor.

Meanwhile, the current path blocking step S200 is a step of blocking the output current path of the ESS by turning off the first current cut-off switch and the second current cut-off switch of the disconnector as the main contactor is turned off and the rear end of the disconnector is in a no-load state after performing the main contactor off step In this way, by sequentially performing the main contactor off step S100 and the current path blocking step S200, a conventional circuit breaker can implement a function of blocking the output current path of the ESS using a disconnector.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

What is claimed is:

1. An energy storage system (ESS) comprising: a plurality of battery modules; and a battery protection unit including: a microcontroller (MCU) configured to control charge and discharge of the ESS; a first main contactor and a second main contactor connecting or disconnecting between the plurality of battery modules and an output terminal of the ESS under control of the MCU; a disconnector disposed between the first main contactor and the second main contactor and connecting or disconnecting the plurality of battery modules, the first main contactor, and the second main contactor; a first fuse having a first end connected to a positive (+) end of the plurality of battery modules and a second end connected to the first main contactor through the disconnector; and a second fuse having a first end connected to a negative (−) end of the plurality of battery modules and a second end connected to the second main contactor through the disconnector, wherein the first main contactor and the second main contactor are turned on or off, by the MCU, depending on whether a predetermined voltage is applied, wherein the disconnector includes:
a first current cut-off switch configured to block a current path flowing through the first main contactor; and a second current cut-off switch configured to block a current path flowing through the second main contactor, and wherein the first current cut-off switch and the second current cut-off switch are turned off when the disconnector is in a no-load state.

2. The ESS of claim 1, wherein the first current cut-off switch has a first end connected to the positive (+) end of the plurality of battery modules and a second end connected to the first main contactor to block a current path flowing through the first main contactor, and wherein the second current cut-off switch has a first end connected to the negative (−) end of the plurality of battery modules and a second end connected to the second main contactor to block a current path flowing through the second main contactor.

3. The ESS of claim 2, wherein the disconnector further comprises an auxiliary switch for controlling whether the predetermined voltage is applied to the first main contactor and the second main contactor.

4. The ESS of claim 3, wherein when the auxiliary switch is turned off, the first main contactor and the second main contactor are turned off by cutting off predetermined power supplied to the first main contactor and the first main contactor, and wherein when the first main contactor and the second main contactor are turned off, the ESS becomes in the no-load state.

5. The ESS of claim 4, wherein the first and second current cut-off switches are turned off after the first and second main contactors are turned off.

6. The ESS of claim 1, wherein when at least one of overvoltage, overcurrent, and high temperature is detected, the MCU is configured to turn off the first main contactor and the second main contactor.

7. The ESS of claim 1, wherein the ESS further comprises a pre-charge FET connected in parallel to the first main contactor to prevent inrush current.

8. The ESS of claim 1, wherein the first fuse is located between the first current cut-off switch and the plurality of battery modules, and wherein the second fuse is located between the second current cut-off switch and the plurality of battery modules.

9. The ESS of claim 8, wherein the first current cut-off switch is located between the first fuse and the first main contactor, and wherein the second current cut-off switch is located between the second fuse and the second main contactor.

10. A method for performing manual power disconnection in an energy storage system (ESS) including a disconnector, a first fuse having a first end connected to a positive (+) end of a plurality of battery modules and a second end connected to a first main contactor through the disconnector, and a second fuse having a first end connected to a negative (−) end of the plurality of battery modules and a second end connected to a second main contactor through the disconnector, the method comprising:

a main contactor off step of converting a rear end of the disconnector into a no-load state; and a current path blocking step of blocking an output current path of the ESS using the disconnector after performing the main contactor off step, wherein the disconnector includes a first current cut-off switch and a second current cut-off switch, and wherein the current path blocking step turns off the first current cut-off switch and the second current cut-off switch of the disconnector to block the output current path of the ESS after the main contactor off step is performed and the disconnector is in the no-load state.

11. The method of claim 10, wherein the main contactor off step turns off the main contactor by cutting off the power supplied to the main contactor, thereby converting the rear end of the disconnector into the no-load state.

* * * * *